May 9, 1939. A. WERTHEIMER 2,157,839
FOOD PREPARATION AND METHOD FOR MAKING THE SAME
Filed Dec. 21, 1934
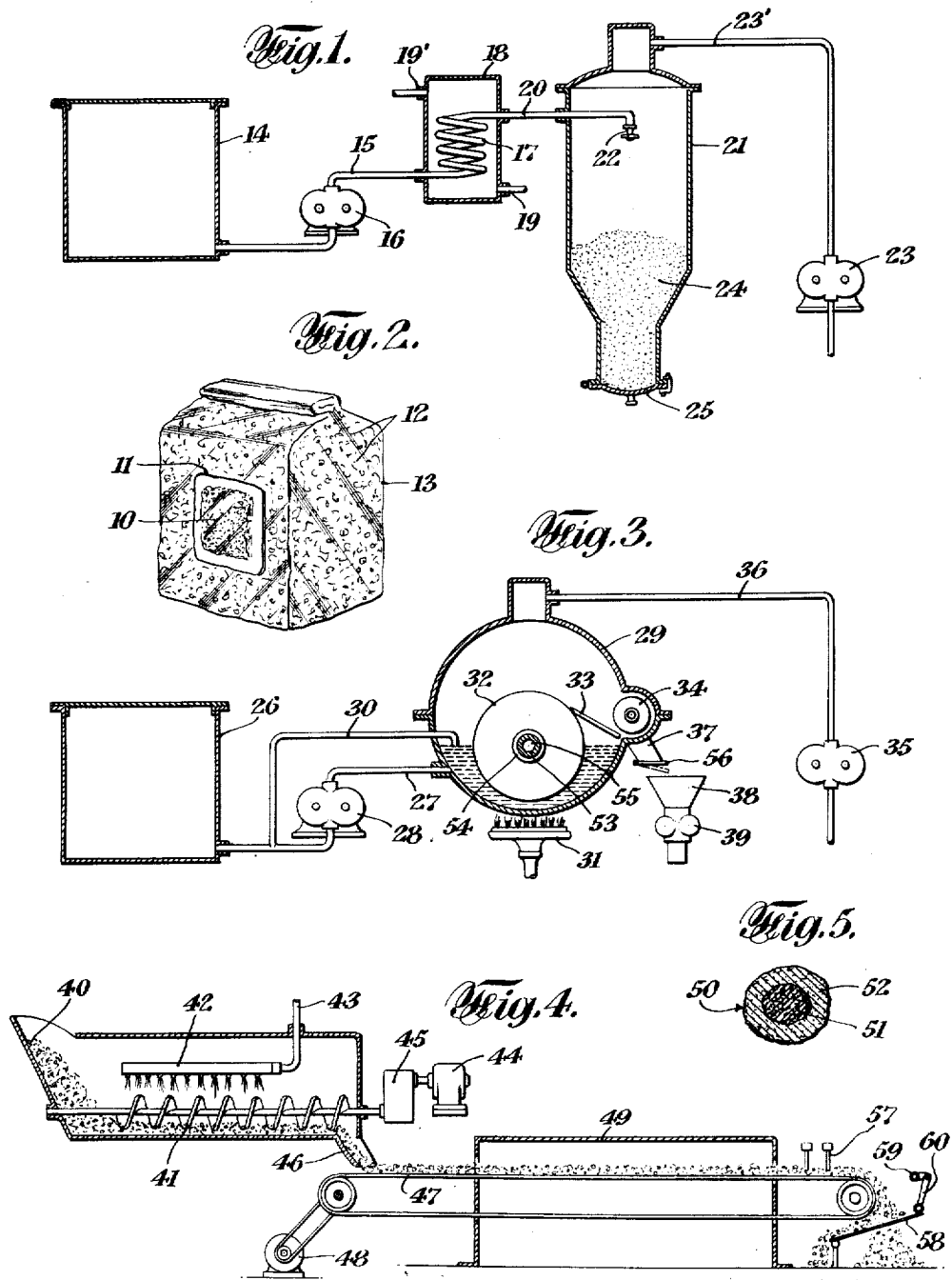
INVENTOR
Amy Wertheimer
BY Kenyon & Kenyon
ATTORNEYS.

Patented May 9, 1939

2,157,839

UNITED STATES PATENT OFFICE 2,157,839

FOOD PREPARATION AND METHOD FOR MAKING THE SAME

Amy Wertheimer, New York, N. Y.

Application December 21, 1934, Serial No. 758,536

6 Claims. (Cl. 99—130)

This invention relates to food preparations and to methods for preparing same. This invention relates especially to the manufacture of gelatine preparations containing flavors such as fruit and vegetable flavors.

It is a purpose of this invention to afford flavored gelatine preparations of such character that the desired flavoring material will be incorporated with the gelatine in a highly natural and palatable state and so that the flavor will be protected against deterioration as by evaporation or oxidation. A particular purpose of this invention relates to the manufacture of tomato concentrate and to the incorporation of such tomato concentrate in a gelatine preparation so that the concentrate and/or the preparation will have a pleasing natural tomato flavor. Further purposes of this invention relate to the preparation of flavor concentrates which have improved naturalness of flavor and to the preservation of the flavor and of other sensitive food constituents against loss and/or deterioration.

By the practice of one embodiment of this invention, a tomato concentrate is prepared and combined with gelatine in a food preparation which is adapted to be sold in package form and which when dissolved in a suitable amount of water, preferably at a somewhat elevated temperature, is adapted to form (when the water is cooled) a tomato aspic having a pleasing and natural tomato flavor. In the development of this invention it has been found that the preparation of tomato concentrates is attended with many difficulties. This is believed to be due to the instability of the substances in tomatoes which impart the flavor (including taste and aroma) thereto. Thus during concentration there is a tendency for the flavoring substances in tomatoes to be evaporated, modified, or destroyed. Moreover, after the concentrate is prepared the tomato flavor is very susceptible to escaping from the concentrate and/or of becoming deteriorated with resultant decrease in the desirability of the product. Such difficulties as these are believed to account for the fact that no commercially satisfactory preparation which can be made into tomato aspic has heretofore been sold commercially in package form. While the difficulties above mentioned have been particularly evident in the concentration of tomato flavor, somewhat analogous difficulties have also been encountered in the concentration of other flavors such as the flavors of other fruits and vegetables.

Some features of this invention may be employed separately and as such are separate parts or features of this invention. Such features of this invention may also be combined with other features so that special advantages result from their combined employment. Thus, one feature of this invention relates to the preparation of a concentrate of a fruit or vegetable flavor such as tomato flavor, for example, under conditions of temperature and pressure which have been found to be favorable to the retention of the tomato flavor in a substantially unaltered state. Thus, preferably pressures below normal atmospheric pressures are used in preparing the concentrated flavor and preferably also the concentration is conducted at a temperature at which the vapor pressure of water is at or greater than the pressure employed during the concentration. Further features of this invention relate to the protection of the flavoring material against loss of flavor by evaporation or oxidation.

In the practice of certain features of my invention, the concentrated flavoring material may be preserved in an envelope of gelatine, the envelope taking several different forms and the flavor within the envelope occurring in several different forms as will be described more in detail below.

Preferably the flavoring material is made into such a form that it is combined with gelatine with the result that the flavored gelatine forms the nucleus of a multiplicity of gelatine particles having a coating of gelatine which is deficient in the flavor of the flavored gelatine and which protects the nucleus containing the flavoring material.

For the purposes of illustration, this invention will be described in connection with the manufacture of a gelatine preparation flavored with tomato. In the preparation of the tomato concentrate, tomato juice, which may be whole tomato juice, for example, which has been removed from tomatoes, after cooking the tomatoes if desired, is maintained at a temperature below about 70° C. and the pressure to which the tomato juice is subjected is maintained below atmospheric pressure and preferably at a pressure which is at or below the vapor pressure of water at the temperature at which the tomato juice is maintained. Under these conditions, the tomato juice is rapidly reduced in water content.

Preferably, the evaporation of the water is continued until the tomato juice is reduced to a gummy mass. It has been found that this gummy mass retains tomato flavor in high degree and that there has been little loss of tomato flavor or modification of the tomato flavor. If the gummy mass is mixed with water, it has been found that it redistributes readily, giving a cloudy red liquid having the appearance of natural tomato juice and having the original tomato flavor substantially unchanged. If gelatine is added to the tomato concentrate as redistributed in water and with or without any additional ingredients such as sugar, salt and the like, and allowed to cool, the mass will form, upon cooling, tomato aspic having a very pleasing flavor. If a relatively clear juice and clear aspic are desired, the juice, before concentration as above described, may be clarified, for example, by filtration or settling, with or without the addition of well-known filter aids.

In the accompanying drawing:

Fig. 1 is a diagrammatic representation of one type of apparatus for making concentrated flavoring material;

Fig. 2 is a perspective view of one type of package of gelatine containing flavoring material;

Fig. 3 is a diagrammatic representation of an alternate type of apparatus for making concentrated flavoring material;

Fig. 4 is a diagrammatical representation of apparatus for coating concentrated flavoring materials, and Fig. 5 is a magnified view of a particle of gelatine preparation containing a highly flavored nucleus and protective envelope.

Hereinabove there has been described a method of preparing concentrated tomato flavoring in the form of a gummy mass, any suitable type of apparatus being used in the process. In accordance with one method of practicing the invention, the gummy mass can be marketed commercially by sealing the gummy mass in a sealed capsule of gelatine for example which may be sold as such or packaged together with other food products such as gelatine. An illustration of such a package is shown in Fig. 2. In this figure, the concentrated tomato flavor 10 in a gummy mass is contained in a sealed capsule 11. The sealed capsule is included in a mass of gelatine 12 in the form of powder, granules or flakes. All these materials may be packaged in a suitable container 13 which may be made of transparent cellulose, waxed paper, or the like, as may be desired.

Inasmuch as there are many well-known methods and machines of introducing material into capsules, no description will be included herein of such methods and machines. The capsule may be either rigid or flexible and may be made in either one or two parts. While their use is less advantageous, two-part unsealed capsules may be substituted for sealed capsules and such capsules will be regarded herein as substantially air or water tight as they are effective in a very substantial degree in preventing fresh air from circulating into contact with the tomato concentrate in the capsule, and in preventing rapid evaporation of the flavor- and aroma-producing ingredients of the concentrate.

In making a package containing tomato flavor in the manner above described, the tomato concentrate may be that which results from concentrating a pint of whole tomato juice. In such case, the concentrate could be packaged with approximately a tablespoon of gelatine. The material in such package would then be adapted merely upon the addition of water to make approximately a pint of tomato aspic. In preparing the aspic from the packaged material the water would, of course, be at a sufficiently high temperature to dissolve the gelatine and the dissolved materials would be permitted to cool until a gel is formed. If the capsule is made of gelatine, it is apparent that no contaminating materials are added to the ingredients of the mixture and that the product may be marketed in this improved form without any additional expense for materials. Of course, as above mentioned, other food materials may be incorporated either before or after the ingredients above mentioned are put up in package form and other materials, preferably water soluble materials, may be employed as a capsule or container for the concentrated flavor.

A preferred method of making concentrated flavoring material may also be employed in the practice of this invention, which preferred method may be practiced using apparatus of the type shown in the accompanying drawing. For purposes of illustration, this preferred method will be described in connection with the preparation of a concentrated flavor mixed with gelatine. In this preferred method gelatine particles flavored with concentrated tomato flavor, for example, are made, which particles are sufficiently hard or congealed to remain in a discrete condition. Thus, for example, tomato juice in concentrated or unconcentrated form may be mixed with gelatine solution after the gelatine has been bleached and/or otherwise purified as is customary in the manufacture of gelatine. The aqueous liquid containing gelatine and tomato juice is then rapidly evaporated under temperature and pressure conditions such as those described above. For example, the evaporation is carried on at temperatures not above 70° C. and at a pressure not above the vapor pressure of water at the temperature at which the liquid is maintained.

The evaporation may be carried out utilizing the apparatus shown diagrammatically in Fig. 1. The liquid containing gelatine and tomato juice is contained in supply tank 14 and is withdrawn therefrom by pipe line 15 and feed pump 16. The liquid is passed through a coil 17 in preheater 18. The preheater 18 has inlet and outlet openings 19 and 19' by which a suitable heating medium such as hot water can be passed through the preheater in heat exchange with the liquid in the coil 17. After having been preheated in coil 17, the liquid is passed by line 20 into the vacuum chamber 21 in which it is sprayed by suitable spray nozzle 22. The liquid is sprayed into the vacuum chamber preferably while it is at a temperature below about 70° C. and while a vacuum is maintained in chamber 21 by means of vacuum pump 23 so that the pressure in the vacuum chamber is not above the vapor pressure of water at the temperature at which the liquid is introduced into the vacuum chamber. The vacuum pump 23 is connected to the vacuum chamber 21 by pipe 23' which carries off water vapor liberated in the chamber 21. When the water is evaporated from the liquid containing flavor and gelatine in chamber 21, the gelatine becomes sufficiently concentrated at the temperature within the chamber 21 to cause the droplets to form relatively small beads of congealed flavored gelatine. These beads collect in the bottom of the chamber 21 in a mass 24. At the bottom of the chamber 21 is an unloading gate 25 from which the beads of flavored gelatine can be withdrawn.

An alternate method of preparing concentrated flavoring material in discrete particles involves the evaporation of water from a liquid containing flavor and gelatine on a rotating drum. Such alternate method will be described in connection with the apparatus shown in Fig. 3. The supply tank in which the liquid containing flavor and gelatine is stored as indicated by the reference character 26. The liquid is withdrawn from the tank 26 by means of pipe 27 and pump 28 and is discharged into a vacuum dryer 29. In order that a constant level may be maintained in the dryer 29, a return pipe 30 is employed. The liquid in the vacuum dryer 29 is preferably maintained in a heated condition by a suitable heating arrangement such as burners 31. Alternatively a heating coil within the chamber 29 may be used or a preheater may be used.

Within the vacuum drying chamber 29 is a rotatable drum 32 which is adapted to pick up a film of liquid containing flavor and gelatine. The drum may be rotated by any suitable means not shown and rotates slowly so that the film of liquid picked up by the drum becomes concentrated by the evaporation of water therefrom so that when the film reaches scraper 33, the film is taken off in the form of flakes or film. The flakes are deposited at one end of a screw conveyor 34.

In order that the liquid containing flavoring constituents may be dried while on the surface of the drum 32, means are provided for heating the surface of the drum. In the embodiment shown in the drawing the surface of the drum is heated by having the interior of the drum hollow and by having the shaft 53, on which the drum is mounted and which rotates in bearings 54, provided with a bore 55 so that a heated fluid such as hot water from a source (not shown) can be circulated through the interior of the drum by passing the fluid into one end of the drum and permitting it to be discharged from the other end of the drum. For this purpose suitable connections (not shown) can be provided. Preferably the surface of the drum 32 is maintained at a temperature not substantially above 70° C. and the atmosphere in chamber 29 is maintained below atmospheric pressure by means of the vacuum pump 35. The vacuum pump communicates with the chamber 29 by pipe line 36 through which the vapors are withdrawn. The pressure within the chamber 29 is preferably maintained so that the pressure is not substantially above the vapor pressure of water at the temperature of the liquid in chamber 29. The body of liquid in chamber 29 is preferably maintained at a temperature substantially below the temperature of the surface of the drum so that evaporation will occur most rapidly on the surface of the drum and less rapidly at the surface of the liquid body. The body of liquid in chamber 29 is preferably preheated somewhat above atmospheric temperature as by the burners 31 above mentioned so that liquid will the more rapidly arrive at the temperature of the surface of the drum after having been taken up by the drum. By way of example, if the surface of the drum is maintained between about 60° and 70° C. then it is usually preferable to heat the body of liquid in chamber 29 to about 30° C. to 50° C.

At the outlet end of screw conveyor 34 is a discharge chute 37 which directs the flaked flavored gelatine into hopper 38 above mill 39. The screw conveyor 34 as an outlet for discharging the solid material, is provided with a suitable vacuum lock or seal (not shown) such that a vacuum can be maintained in chamber 29. Alternatively the discharge chute 37 can be provided with a gate 56 at the bottom thereof which when closed will afford a substantially air-tight closure for the bottom of the chute so that the vacuum can be maintained in chamber 29. The mill 39 is of such character as to grind the flavored gelatine to small particle size.

Above have been described methods of producing concentrated flavoring material in the form of discrete particles and such particles can be made either continuously or batchwise. The particles thus manufactured can be incorporated in sealed or substantially air-tight capsules as above described in connection with the gummy concentrate hereinabove referred to.

It is an important feature of this invention, however, that the discrete particles be protected so that each of the particles is contained in a protective envelope. To this end, the particles are coated with unflavored gelatine, thereby surrounding each of the particles of flavored gelatine with an envelope of unflavored gelatine or of gelatine relatively low in flavor content.

A method of coating the particles of flavored gelatine may be employed in connection with the apparatus diagrammatically shown in Fig. 4. The particles of flavored gelatine (as made, for example, using either the apparatus shown in Fig. 1 or the apparatus shown in Fig. 3) are fed into the apparatus by feeding hopper 40 and are thereby brought into operative relation with respect to the conveyor-mixer 41. Above the conveyor-mixer 41 is a spraying device 42 fed by pipe 43 which leads to a suitable source of gelatine solution not shown. Unflavored gelatine solution may be fed through the spraying device and sprayed on to the particles of flavored gelatine which are kept in agitation by the blades of conveyor-mixer 41. The conveyor-mixer may be rotated by any suitable means such as motor 44 connected to the conveyor-mixer by means of reduction gears 45. The particles of flavored gelatine become coated with a layer of unflavored gelatine solution while the particles are kept in agitation by the conveyor-mixer. The particles of flavored gelatine coated with unflavored gelatine solution are discharged by discharge chute 46 on to conveyor 47 which is preferably in the form of a continuous conveyor belt driven by any suitable means such as the motor 48 and suitable reduction gears. The particles of flavored gelatine which are coated with unflavored gelatine solution, move on conveyor 47 through dryer 49 in which the coating of unflavored gelatine solution becomes solidified so that when the particles are removed from the dryer, each particle of flavored gelatine is encased in an envelope of unflavored gelatine. Should the particles of gelatine coalesce somewhat on the conveyor 47, agitation of the mass may be provided by guide blades, rakes or the like indicated diagrammatically at 57 and/or by a vibrating screen 58 actuated by crank 59 and link 60. Such agitating means will cause the various particles to be freed from each other so that the resulting product consists of a multiplicity of discrete beads or particles.

In Fig. 5, one of the coated particles or beads is shown in section. The bead is indicated generally by the reference character 50 and comprises a nucleus 51 of highly flavored gelatine and an envelope 52 (somewhat exaggerated in thickness for greater clarity) of unflavored gelatine.

In the drying of the particles of flavored gelatine coated with unflavored gelatine, the evaporation is preferably carried out under conditions such that the water in the gelatine coating film does not boil, thus producing residual envelopes of solid or congealed gelatine for the flavored gelatine nuclei which envelopes are as free as possible from pits or holes such as might result from the formation of bubbles caused by boiling of the coating of gelatine solution during the drying thereof. The evaporation of the coating of gelatine solution may be carried out under reduced pressure, but in such case, it is preferable to hold the temperature so low and/or to maintain the pressure so high that actual boiling of the coating of gelatine solution is avoided. Alternately, the coating of gelatine solution may be evaporated at a moderate temperature in a current of air of controlled humidity so as to prevent too rapid surface evaporation and premature surface hardening which would inhibit evaporation of the inner layers of the coating.

In the preferred method above described, it is an important feature of this invention that a gelatine food product is produced comprising comminuted gelatine, the main body of each particle thereof containing flavoring matter and being surrounded with a protective film of gelatine relatively free of flavor. Such a product may be packaged in any desired way and in units of any desired size. To use it, it is only necessary to dissolve the desired amount in hot water and allow the water to cool as is well-known in the use of gelatine-containing food products. If not too much water is used, the product upon becoming cooled will form a flavored gel that is a pleasing article of food.

In the above description, mention has been made of making flavored gelatine as a nucleus and surrounding the nucleus with unflavored gelatine. It is to be understood, however, while this is preferred practice, the nuclei of flavored gelatine may also be surrounded by gelatine having a lesser concentration of the flavor of the nucleus. Likewise, the gelatine in the external coating may be flavored with some other flavor than the flavor in the nucleus. From this point of view, it is important that a nucleus containing flavored gelatine be surrounded by a protective sheath of gelatine which substantially reduces deterioration and loss of the flavor in the product as compared with a product in which the flavor is substantially evenly distributed in each of the particles of the flavored gelatine. Other coatings or envelopes, preferably water soluble and bromatological, may be used than gelatine. Such coatings may consist of or comprise amorphous, non-deleterious edible materials which form relatively impervious films when deposited from solutions or dispersions, as on drying; examples of such materials are soluble starch, dextrine, gum arabic, agar-agar, other water-soluble vegetable gums, water-soluble proteins, etc.

In the practice of this invention, it is not essential that the nuclei of the particles constitute flavored gelatine. Thus, some flavors may be concentrated so as to themselves be in solid form. Such concentrated flavors can first be made in comminuted form and then given a coating of gelatine so that each of the particles is encased in a gelatine coating. Likewise concentrated flavor may be incorporated in other solid vehicles such as sugar, for example, to make a flavored concentrate in the form of a multiplicity of small particles which particles may be encased in an envelope of gelatine.

The special concentration treatment which results in little loss in flavor or deterioration of flavor has been described above particularly in connection with the concentration of tomato juice. As aforesaid, the concentration of tomato juice has been found to be attended with many difficulties but has been successfully accomplished by the methods hereinabove described. Other juices of fruits and vegetables, for example, may be likewise concentrated in a similar manner. Thus, juice may be expressed from fruit such as oranges, lemons, limes, grapes, cherries, berries, etc. and from vegetables such as cucumbers, spinach, carrots, celery, onions and the like and concentrated by evaporation of water therefrom at temperatures not substantially above 70° C. and at a pressure not substantially above the vapor pressure of water at the temperature at which the juice is maintained. These juices may be reduced to a paste form or in certain cases to a solid or semi-solid form such as a granular form. When the juice is reduced only to a pasty or even liquid condition, the same in preferred practice can be mixed with gelatine solution and evaporated so as to produce flavored gelatine particles which particles are thereafter coated with a protective coating. Such specially prepared concentrated flavors may likewise be sold per se as in gelatine capsules or in packages containing other food products such as gelatine. When such specially prepared concentrated flavors are produced in a granular or other finely divided desiccated form without being mixed with gelatine such particles are preferably each coated with a protective coating such as a coating of gelatine.

In certain cases, whole fruits or whole vegetables, such as the fruits and vegetables above mentioned that contain the juices that impart characteristic flavor thereto may be dried under a vacuum and as above stated in such case, the temperature is preferably kept below 70° C. and the pressure is maintained so that it is not substantially above the vapor pressure of water at the temperature at which the material being concentrated is maintained. When whole fruits or whole vegetables are dried in this manner, it is preferable to sub-divide them so that the process may be carried out more rapidly and the resultant desiccated product may be protected in any of the ways above described.

While this invention has been described in connection with certain specific examples thereof, it is to be understood that this has been done merely for the purposes of illustration and that the scope of this invention is to be governed by the following claims. The words "soluble" and "solution" are used in a broad sense to include colloidally soluble and colloidal solutions respectively.

I claim:

1. A method of making a flavored food preparation which comprises evaporating water from a flavored food product at sub-atmospheric pressure, producing the resulting concentrated food product in the form of a mass of discrete particles, coating the individual particles of a mass of said food product in finely-divided and desiccated condition with an envelope of gelatine solution and drying the envelope of gelatine solution under sub-atmospheric pressure without boiling the gelatine solution of said envelope.

2. A method of making a food preparation which comprises preparing an aqueous liquid containing flavored gelatine, evaporating water from the liquid so that the flavored gelatine will congeal at ordinary temperatures, producing the congealed flavored gelatine in finely-divided form, and coating the individual particles of congealed flavored gelatine with gelatine dispersed in water which gelatine is deficient in the flavor of said flavored gelatine and drying said gelatine coating to form adherent protective envelopes about said particles of flavored gelatine.

3. A method of making a food preparation which comprises preparing a flavored concentrate in the form of a multiplicity of finely-divided particles of gelatine containing said flavor concentrate, spraying the individual particles with gelatine solution deficient in the flavor of said flavored gelatine while the particles are kept in a state of agitation to coat said particles with said gelatine solution, and drying the coating of gelatine solution on said particles.

4. A method of making a food preparation which comprises preparing a flavored concentrate in the form of a multiplicity of finely-divided particles, spraying the individual particles of gelatine containing said flavor concentrate with gelatine solution while the particles are kept in a state of agitation to coat said particles with said gelatine solution, drying the coating of gelatine solution on said particles, the drying being performed without boiling the gelatine solution coating said particles.

5. A food preparation which comprises a multiplicity of discrete particles, the individual particles of which have a nucleus of flavored gelatine and surrounding said nucleus a thin adherent envelope of gelatine deficient in the flavor of said flavored gelatine.

6. A food preparation which comprises a multiplicity of discrete particles, the individual particles of which have a nucleus of flavored gelatine and surrounding said nucleus a thin adherent water-soluble protective envelope deficient in the flavor of said flavored gelatine which prevents the flavor of said flavored gelatine from diminishing.

AMY WERTHEIMER.

---

CERTIFICATE OF CORRECTION.

Patent No. 2,157,839.　　　　　　　　　May 9, 1939.

AMY WERTHEIMER.

It is hereby certified that error appears in the printed specification of the above numbered patent requiring correction as follows: Page 5, first column, lines 21 and 22, claim 4, strike out the words "of gelatine containing said flavor concentrate" and insert the same after the syllable "ticles" and before the comma in line 21, same claim; and that the said Letters Patent should be read with this correction therein that the same may conform to the record of the case in the Patent Office.

Signed and sealed this 27th day of June, A. D. 1939.

(Seal)　　　　　　　　　　　　　　　　　Acting Commissioner of Patents.
　　　　　　　　　　　　　　　　　　　　Henry Van Arsdale congealed flavored gelatine in finely-divided form, and coating the individual particles of congealed flavored gelatine with gelatine dispersed in water which gelatine is deficient in the flavor of said flavored gelatine and drying said gelatine coating to form adherent protective envelopes about said particles of flavored gelatine.

3. A method of making a food preparation which comprises preparing a flavored concentrate in the form of a multiplicity of finely-divided particles of gelatine containing said flavor concentrate, spraying the individual particles with gelatine solution deficient in the flavor of said flavored gelatine while the particles are kept in a state of agitation to coat said particles with said gelatine solution, and drying the coating of gelatine solution on said particles.

4. A method of making a food preparation which comprises preparing a flavored concentrate in the form of a multiplicity of finely-divided particles, spraying the individual particles of gelatine containing said flavor concentrate with gelatine solution while the particles are kept in a state of agitation to coat said particles with said gelatine solution, drying the coating of gelatine solution on said particles, the drying being performed without boiling the gelatine solution coating said particles.

5. A food preparation which comprises a multiplicity of discrete particles, the individual particles of which have a nucleus of flavored gelatine and surrounding said nucleus a thin adherent envelope of gelatine deficient in the flavor of said flavored gelatine.

6. A food preparation which comprises a multiplicity of discrete particles, the individual particles of which have a nucleus of flavored gelatine and surrounding said nucleus a thin adherent water-soluble protective envelope deficient in the flavor of said flavored gelatine which prevents the flavor of said flavored gelatine from diminishing.

AMY WERTHEIMER.

CERTIFICATE OF CORRECTION.

Patent No. 2,157,839.  May 9, 1939.

AMY WERTHEIMER.

It is hereby certified that error appears in the printed specification of the above numbered patent requiring correction as follows: Page 5, first column, lines 21 and 22, claim 4, strike out the words "of gelatine containing said flavor concentrate" and insert the same after the syllable "ticles" and before the comma in line 21, same claim; and that the said Letters Patent should be read with this correction therein that the same may conform to the record of the case in the Patent Office.

Signed and sealed this 27th day of June, A. D. 1939.

(Seal)

Henry Van Arsdale
Acting Commissioner of Patents.